United States Patent [19]

Pollak et al.

[11] Patent Number: 5,097,601
[45] Date of Patent: Mar. 24, 1992

[54] MITER GAUGE WITH ADJUSTABLE WIDTH LEAD ARM

[75] Inventors: Henry Pollak; Edwin N. Hartz, both of Pottstown, Pa.

[73] Assignee: American Machine & Tool Company, Inc., Royersford, Pa.

[21] Appl. No.: 566,943

[22] Filed: Aug. 13, 1990

[51] Int. Cl.⁵ .............................................. B26D 7/06
[52] U.S. Cl. ...................................... 33/471; 33/469; 83/437
[58] Field of Search .......................... 33/468, 469, 471; 83/437, 477.2, 581, 468.7, 522.13

[56] References Cited

U.S. PATENT DOCUMENTS

| | | | |
|---|---|---|---|
| 503,726 | 8/1893 | Pryibil | 83/437 |
| 2,502,124 | 3/1950 | Bray | 83/437 |
| 2,710,633 | 6/1955 | Obern | 83/437 |
| 4,158,320 | 6/1979 | Kay | 83/437 |
| 4,514,909 | 5/1985 | Gilbert | 33/471 |

Primary Examiner—Thomas B. Will
Attorney, Agent, or Firm—Panitch, Schwarze, Jacobs & Nadel

[57] ABSTRACT

An improved miter gauge includes a gauge body and a lead arm pivotally coupled together. The lead arm is provided by a substantially rigid member which includes a plurality of slots formed in a length direction of the member which define adjoining side wall portions of the rigid member. A plurality of threaded bores are provided, each through one of the side wall portions, in communcation with one of the slots. A plurality of set screws are provided in the threaded bores and are adjustable to project out of the rigid member or to span the slot and contact the opposing side wall portions of the member so that overall width of the rigid member of the miter gauge can be adjusted to fit the width of a guiding slot on a piece of power equipment.

9 Claims, 3 Drawing Sheets

MITER GAUGE WITH ADJUSTABLE WIDTH LEAD ARM

FIELD OF THE INVENTION

The present invention relates to miter gauges and, more particularly, to a miter gauge adjustable for changing overall width of its lead arm.

BACKGROUND OF THE INVENTION

A conventional miter gauge typically used in conjunction with any of a variety of pieces of power equipment, like a miter saw, sander or a band saw, is shown in FIG. 1. The conventional miter gauge includes a gauge body 1a and a lead arm 2a pivotally attached thereto through bolt 12a. The gauge body 1a has a semicircular circular plate 11a having a calibration of degrees thereon for accurately positioning the relative angular relation of the gauge body with respect to the lead arm.

A guiding slot is typically provided on the top surface of a work table typically supplied with each of the different types of power equipment noted above. The lead arm 2a of a conventional miter gauge is essentially a bar having a constant, fixed width approximately equal to that of the guiding slot so that the whole miter gauge can be fitted to the work table of the equipment by insertion of the lead arm into the guiding slot.

Manufacturers of such power equipment usually sell their products together with a miter gauge having a lead arm of constant, fixed width generally nearly equal to that of the guiding slot provided on the work table of the equipment. However, miter gauges from different manufacturers typically cannot fit the equipment of other manufacturers because the width of the guiding slots typically differ from manufacturer to manufacturer as do the widths of the lead arms of the miter gauges. In addition, even gauges supplied by manufacturers with their own equipment are often loose and poorly fitted to the equipment. This is a major disadvantage of the conventional miter gauge.

SUMMARY OF THE INVENTION

It is therefore the main object of the present invention to solve the fit problems associated with prior miter gauges by providing an improved miter gauge with a lead arm adjustable in width for making the lead arm suitable for use with guiding slots of various widths.

Accordingly, the improved miter gauge of the present invention comprises a gauge body and lead arm means attached to the gauge body. The lead arm means includes a substantially rigid elongated member and adjustment means on the rigid member for adjusting overall width of the lead arm means. Preferably, the adjustment means comprises a plurality of individual width adjusting members each adjustably mounted to the rigid member.

IN THE DRAWINGS

The foregoing summary, as well as the following detailed description of preferred embodiments in the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE PREFERRED EMBODIMENT

Figure 1:
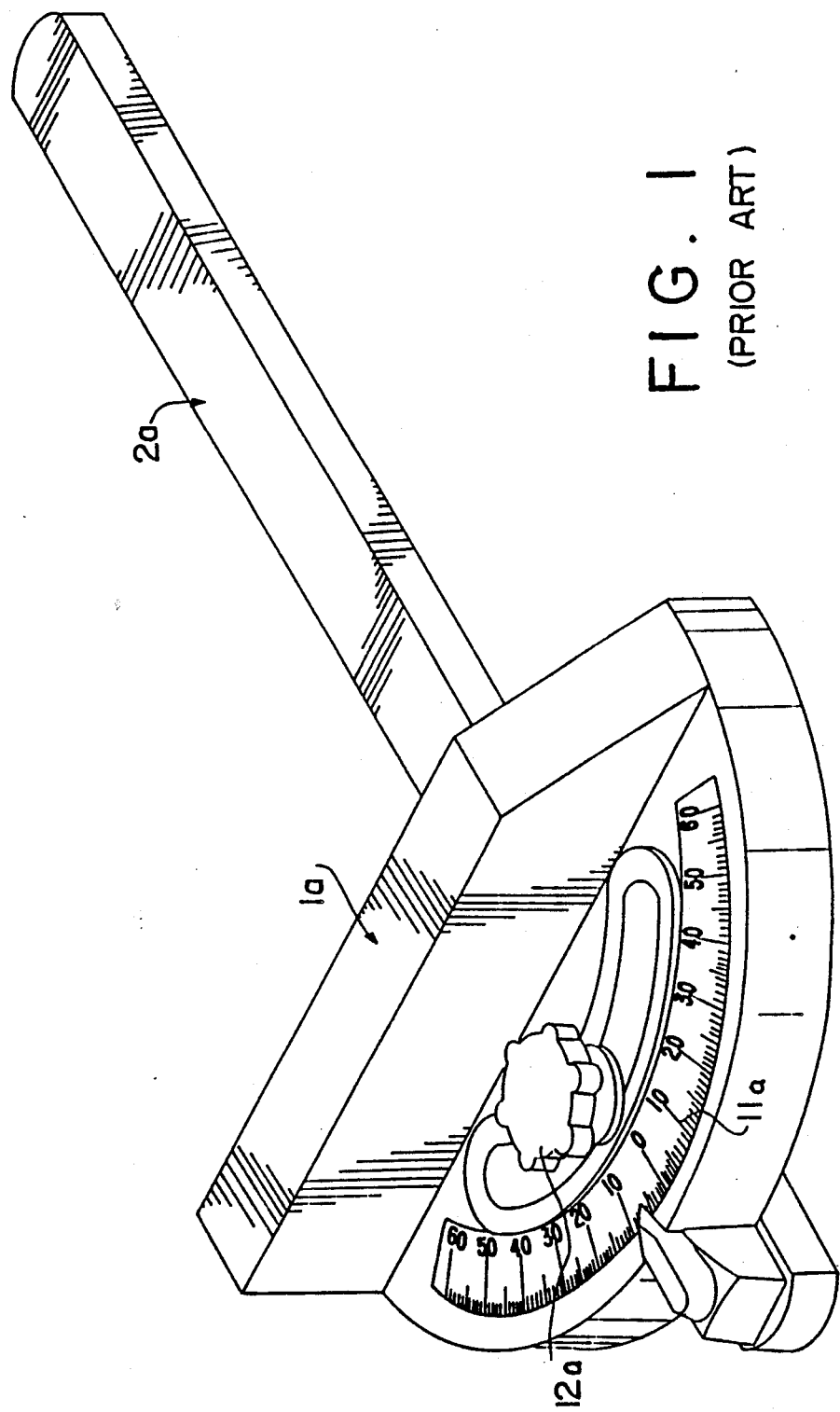
FIG. 1 is a perspective view of a conventional miter gauge.
Figure 2:
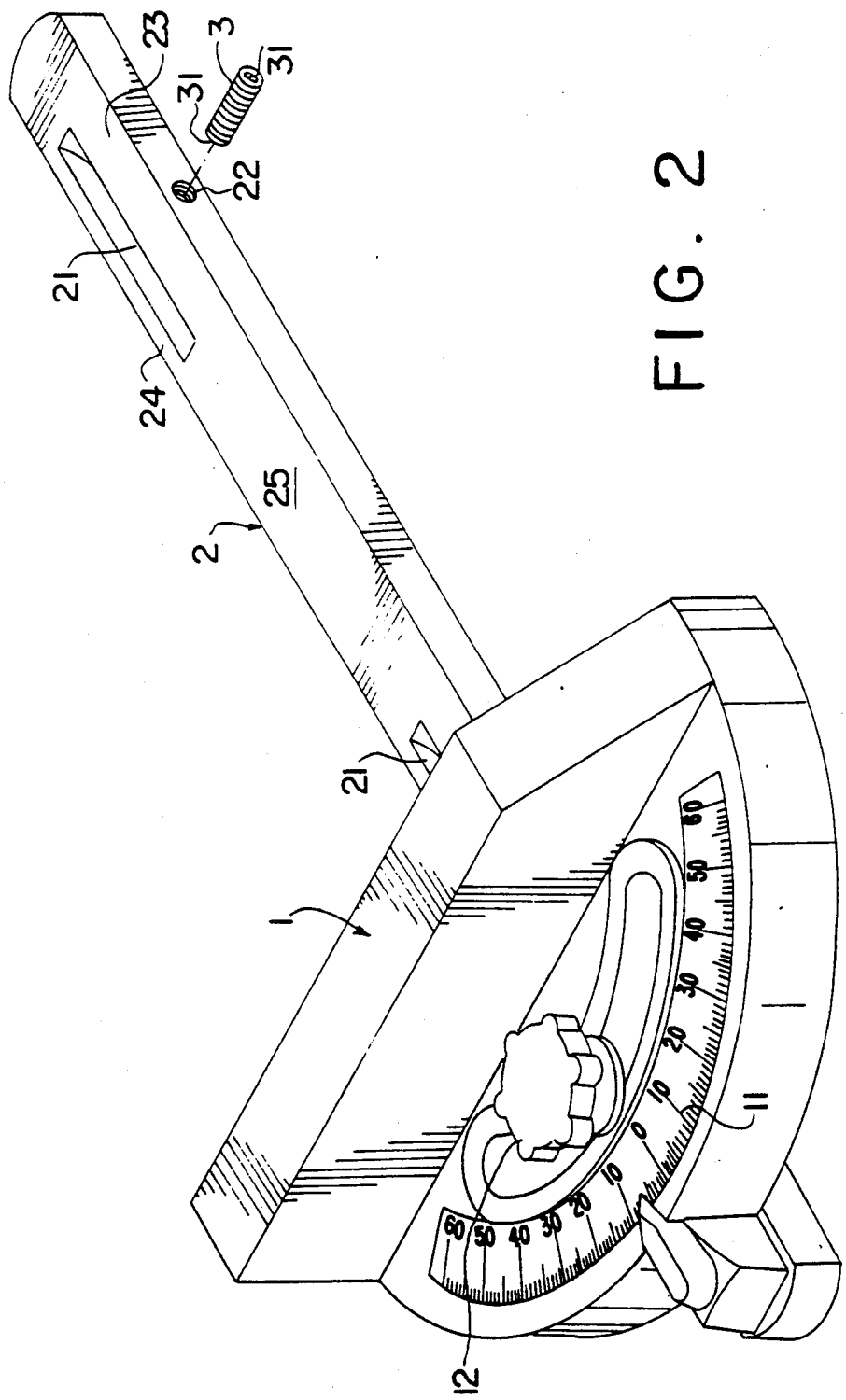
FIG. 2 is a partially exploded view of an improved miter gauge in accordance with the present invention.

Referring to FIG. 2, the improved miter gauge of the present invention comprises a gauge body 1 and lead arm means indicated generally at 2. Lead arm means 2 includes a substantially rigid member or strap 25 having an elongated dimension extending away from the body 1 and a width dimension perpendicular thereto, in the plane of FIG. 3, for example. The body 1 of the improved miter gauge further includes a calibration plate 11 and bolt 12, which are similar to those of the conventional miter gauge shown in FIG. 1, and will not be detailed for the purpose of simplicity.

The preferred lead arm means 2 includes at least one and preferably two slots 21 which extend in an elongated direction of the rigid member 25 and transversely through the rigid member 25, forming two pairs of opposing side wall portions 23/24. Only one pair is marked in FIG. 2. Each pair of side wall portions 23/24 abuts one of the two slots 21 on opposing sides of each slot. Preferably, the width of one side wall portion 23 is greater than the width of the other side wall portion 24 for reasons which will become apparent. A threaded bore 22 formed through each thicker or wider side wall portion 23 to communicate with the adjoining slot 21. The lead arm means 2 further comprises a pair of headless set screws 3, each preferably having a length longer than the width of the side wall portion 23. One screw 3 is provided in each threaded bore 22. Preferably, hexagonal recesses are formed in each of the two ends 31 of each set screw 3 to receive a hex wrench for adjusting the position of the screw 3.

Figures 3, 4:
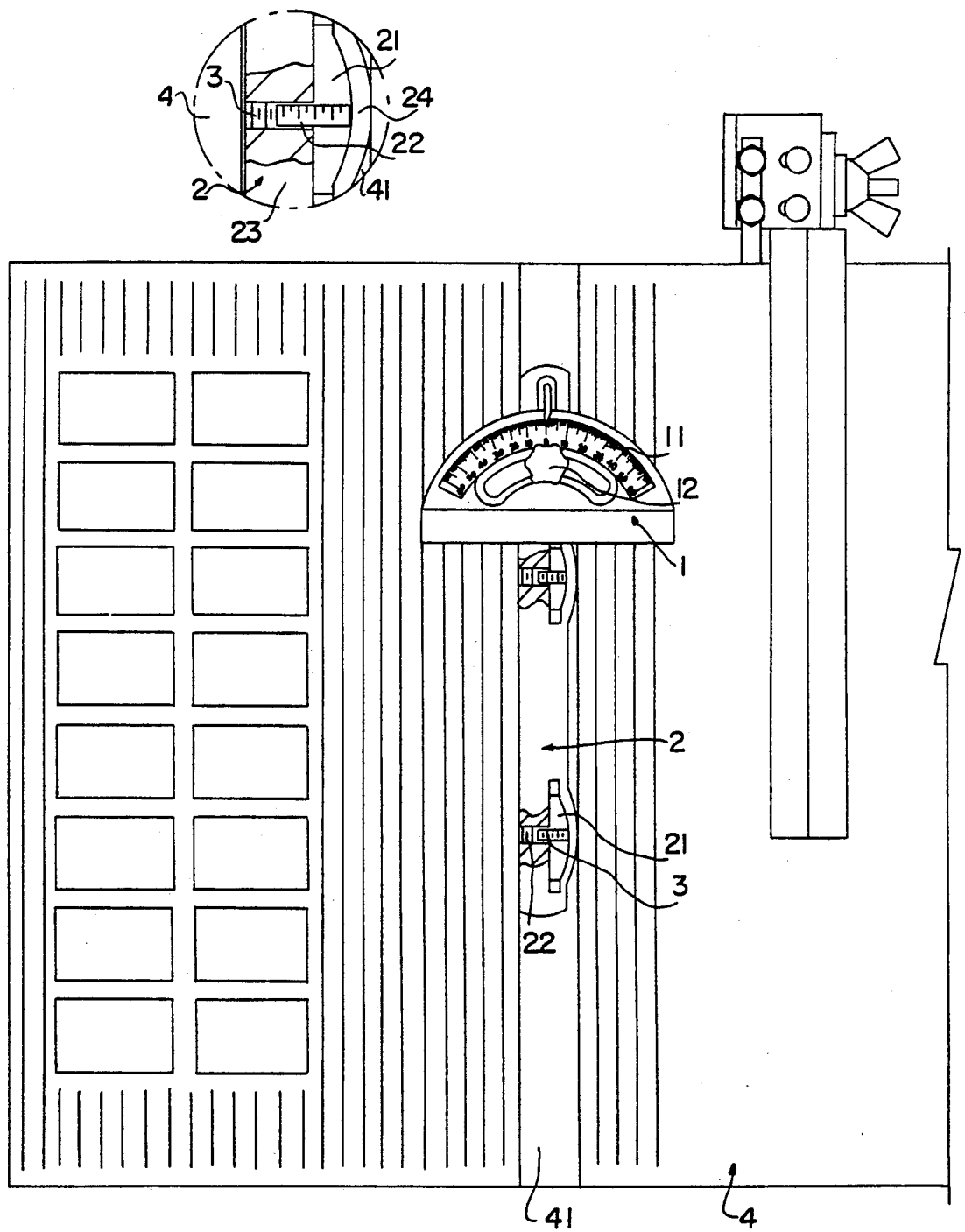
FIG. 3 is a top elevation of a piece of power equipment showing the miter gauge of the present invention being properly adapted to fit the guiding slot provided on the equipment for receiving the miter gauge.
FIG. 4 is an enlarged view of a portion of FIG. 3.

Referring to FIG. 3, the top elevation of a work table portion of a conventional piece of power equipment is shown, indicated generally at 4. The equipment 4 has a guiding slot 41 formed thereon to receive the lead arm means 2 of the miter gauge. When the improved miter gauge of the present invention is to be fitted on the equipment 4, the operator first adjusts the overall width dimension of the lead arm means 2 by adjusting each set screw 3. Normally each set screw 3 may be adjusted by screwing it into its respective threaded bore 22 until it spans the slot 21, contacts the opposing side wall portion 24 and deflects that portion 24 outwardly, thereby effectively increasing the width of the lead arm means 2 by increasing the width of the rigid member 25 at each of its slots 21. The adjusted lead arm means 2 can then be inserted into a receiving guiding slot 41. If desired, the end of the rigid member or strap 25 can be inserted into the slot 41 up to the set screw 3 and the screw 3 adjusted to a desired setting before sliding the rest of the strap 25 into the slot 41.

Other possible and less preferred ways of using the device include adjusting each screw 3 so that an end 31 projects outwardly from the lead arm means 2 and side wall portion 23. The overall width of the lead arm means 2 includes the width of the rigid member 25 and the length of that portion of the set screw 3 projecting out of the side wall 23. This overall width should closely approximate the width of the guiding slot 41 receiving the lead arm means 2. The improved miter gauge of the present invention can then be installed on the equipment 4 with the lead arm means 2 fitting tightly into the guiding slot 41 of the equipment 4.

Another possible way of fixing the improved miter gauge of the present invention into the equipment 4 is to first place the lead arm in the guiding slot 41 of the equipment 4 with each set screw 3 retracted into its threaded bore 22 sufficiently for easy insertion. The operator may then apply a small angled hex wrench to the end portion 31 of each set screw 3 through its associated slot 21 to adjust the set screw 3 to extend sufficiently out of the side wall portion 23 until it contacts an adjoining side wall of the guiding slot 41.

Since at least two slots 21 and set screw 3 are preferably provided on the lead arm means 2 of the improved miter gauge of the present invention, the lead arm means 2 can be securely fitted in the guiding slot 41 of various pieces of equipment 4, regardless of the differences in width of such slots from manufacturer to manufacturer.

Preferably, the lead arm means 2 is made from a substantially rigid elastic material such as steel, but other metals and even plastics can be used. Such materials are sufficiently rigid so as to be capable of being fitted securely in guiding slots and yet have flexibility, malleability or preferably elasticity sufficient to permit the side wall portion 24 to be outwardly deflected, in the manner described above, if that method of installation is desired and, preferably, to return to its original configuration.

Preferably, the nominal width of the rigid arm 25 is slightly less, for example, about five mils less, than the nominal width of the guide slot. In the U.S., the most common nominal guide slot width is three-quarter inch with five-eighths inch perhaps the next most common. Actual widths of guide slots are typically greater than the nominal width, typically between about two to eight mils greater. The preferred steel arm 25 of the present invention is quite capable of width expansions of at least twenty mils by threading the set screws 3 inwardly to contact opposing wall portions 24. In many instances an increase of only a few thousandths of an inch in the width of the lead arm means 2 by this method will be sufficient to provide a good tight fit between the gauge and the guide slot.

In addition to being capable of adjustment to compensate for variations in actual guide slot widths, the present device is capable of adjustment to select the degree of snugness desired by the user. Thus, the device 10 can be adjusted to fit firmly and immovably in the slot or to slide with any desired degree of resistance.

It is apparent that an improved miter gauge of the present invention can be fitted to the guiding slot of any of a variety of pieces of power equipment whereby the disadvantage of the conventional miter gauge with a lead arm of constant, fixed width is completely obviated.

Although the present invention has been described by way of a preferred embodiment, changes and modifications would be apparent to those of ordinary skill in the art. Therefore, the present invention is not limited to the particular embodiment or precise arrangements disclosed, but is intended to cover any modifications which are within the scope and spirit of the invention, as defined by the appended claims.

We claim:

1. An improved miter gauge comprising a gauge body and a lead arm attached to the gauge body, the lead arm including a substantially rigid, elongated member having a slot extending in an elongated direction of the rigid member and transversely entirely through the member forming a pair of opposing spaced, longitudinally extending side wall portions of the member, and adjustment means on the rigid member for adjusting the spacing between the side wall portions to adjust the overall width of the lead arm.

2. The improved miter gauge of claim 1 wherein the adjustment means comprises a plurality of individual, width-adjusting members each adjustably mounted to the rigid arm.

3. The improved miter gauge of claim 1 wherein the rigid member includes at least one threaded bore and wherein the adjustment means includes a threaded member received in the threaded bore, the position of the threaded member in the bore being adjustable in a width direction of the lead arm transverse to the elongated direction of the rigid member.

4. The improved miter gauge of claim 3 wherein said slot communicates with said threaded bore, and wherein the threaded member has a length greater than a width of the slot so that the slot can be spanned by the threaded member.

5. The improved miter group of claim 3 wherein at least one of the threaded members has two end portions, each end portion being formed with a hexagonal recess.

6. The improved miter gauge of claim 3 wherein said rigid arm includes at least one additional slot spaced from the first slot, the additional slot extending in an elongated direction of the rigid member and transversely entirely through the member forming a pair of opposing spaced, longitudinally extending side wall portions of the member, a separate threaded bore being in communication with each slot, and wherein each of the threaded members has a length sufficiently greater than a width of the slot in communication with the bore of the threaded member so that the member spans the width of the slot.

7. The improved miter gauge of claim 1 wherein the side wall portions of the members are integrally connected together at a longitudinal end of the slot.

8. The improved miter gauge of claim 1 wherein the side wall portions of the members are integrally connected together at both longitudinal ends of the slot.

9. The improved miter gauge of claim 3 wherein the threaded bore and threaded member are located in one of the side wall portions and the threaded member contacts and outwardly deflects the other side wall portion.

* * * * *